Oct. 21, 1941.   G. O. HALL   2,259,852
COOLING APPARATUS FOR BEVERAGE DISPENSERS
Filed Dec. 12, 1938
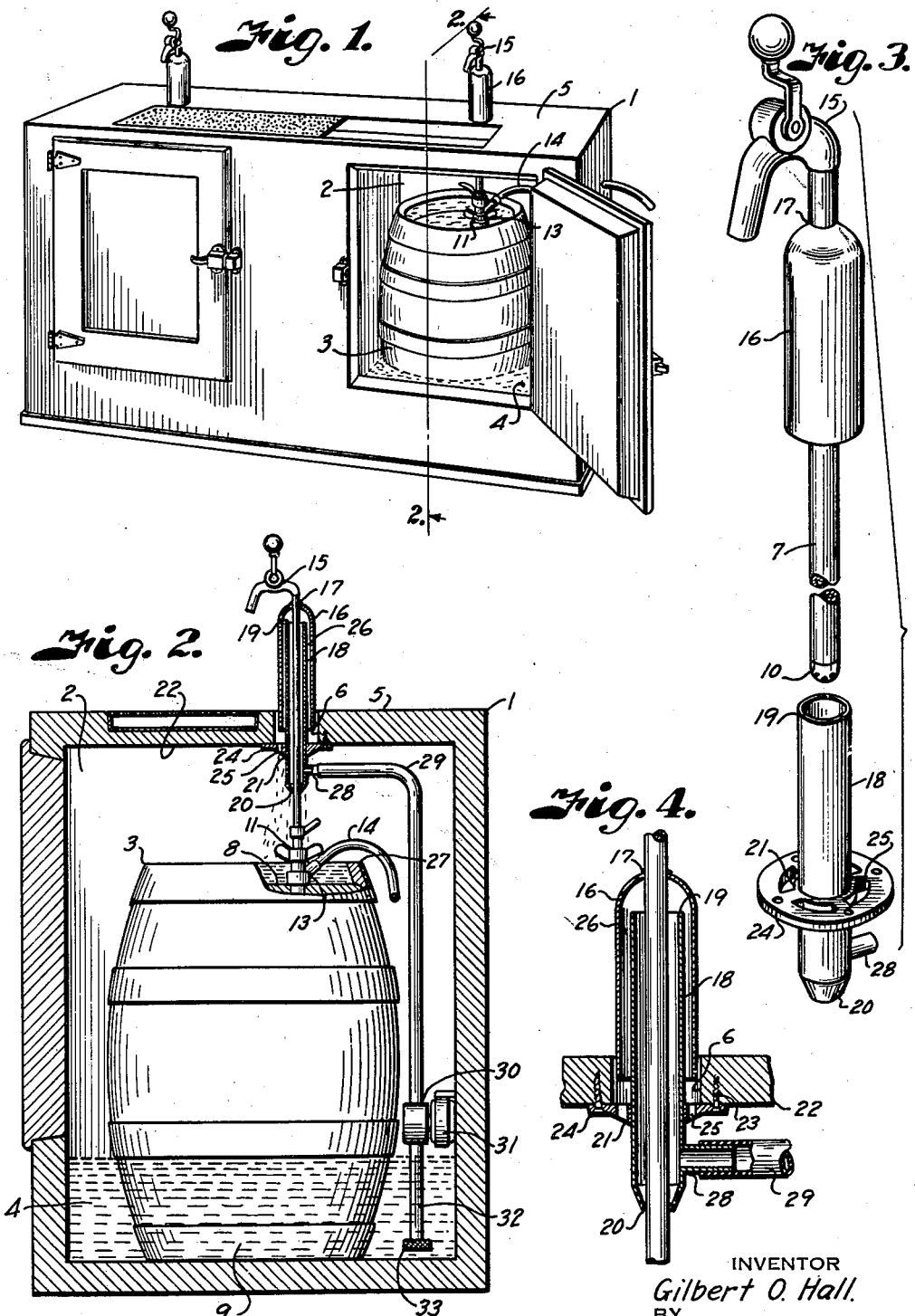
INVENTOR
Gilbert O. Hall.
BY
Arthur C. Brown
ATTORNEY Patented Oct. 21, 1941

2,259,852

UNITED STATES PATENT OFFICE 2,259,852

COOLING APPARATUS FOR BEVERAGE DISPENSERS

Gilbert O. Hall, Kansas City, Mo.

Application December 12, 1938, Serial No. 245,159

4 Claims. (Cl. 62—33)

This invention relates to a cooling apparatus for beverage dispensers and more particularly to an apparatus of that character for cooling beer on tap in metal kegs, wooden barrels or other suitable containers as well as in the tap conduits leading from the container to the tap or like faucet arranged exteriorly of a bar or similar enclosure for the containers.

Beer is ordinarily received by a retailer upon delivery from a brewery, for example, at a temperature above the proper drinking temperature and if served immediately the beer is not as palatable as it should or could be. Furthermore, beer, when tapped from improperly serviced containers, is apt to be wild, flat, stale, warm, and/or sour. The so-called "morning beer" remaining over-night in the container tap conduits is also apt to have a poor head and must be wasted in order to draw properly serviced beer suitable for serving.

The principal objects of the present invention are to provide an apparatus arranged to quickly cool containers and beer therein to proper drinking temperatures in such a manner as to avoid delay in rendering a container of beer servable in its most palatable form; to service the beer in the container tap conduits in such a manner as to overcome the necessity for wasting the beer, normally contained therein; and to assure that every glass of beer served is palatable from a properly serviced standpoint.

Other important objects of the present invention are to provide an apparatus of this character capable of incorporation into conventional beverage dispensing equipment; to provide for circulating a refrigerating medium over and about a container of beer and its tap conduit in heat transfer relation thereto; to provide an improved cooling jacket for portions of the tap conduits normally exposed to high temperatures relative to proper drinking temperatures; to provide an apparatus of this character which is simple and economical in construction, efficient in operation, and which is easily assembled and disassembled in relation to a container of beer to the end that the supply of beer may be readily replenished and the tap conduits cleansed at will; to provide a novel circulation system in relation to the beer containers and tap conduits therefor; and to provide improved elements and arrangements of elements in an apparatus having the noted characteristics.

In accomplishing these and other objects of the present invention, I have provided improved details of structure, the preferred form of which is illustrated in the accompanying drawing, wherein:

Fig. 1 is a perspective view of a beverage service unit having an apparatus embodying my invention applied thereto.

Fig. 2 is a vertical section through the service unit on the line 2—2, Fig. 1, particularly illustrating the tap conduit cooling jacket and the relation of the circulation system and beer container thereto.

Fig. 3 is a detail perspective view of a tap conduit having a cooling jacket applied thereto, cooperative elements of the cooling jacket being shown in disassembled spaced relation.

Fig. 4 is a detail vertical cross-section through the tap conduit cooling jacket particularly illustrating the manner in which it is applied to a beverage service unit.

Referring more in detail to the drawing:

1 designates a beverage service unit having suitably insulated compartments 2 of a size adapted to receive therein beverage containers 3 such as kegs or barrels of beer. The door openings of the compartments are preferably arranged above the floor thereof in such a manner that a refrigerating medium 4 may be housed in the compartments in heat transfer relation to the lower ends of containers therein. The refrigerating medium 4 may be water or the like which may be cooled by conventional coils (not shown) suitably arranged in the unit, or which may constitute melted ice (not shown) located in a suitable place in the unit. The top wall 5 of the service unit forms a bar or similar serving table and may be of any suitable character.

Openings 6 are provided in the bar 5 of the unit for the passage therethrough of conduits to tap the beer containers and deliver the beer to a suitable dispensing point on the bar.

The conduits each preferably include a tap rod 7 adapted to be inserted through the bar openings 6 from the top of the bar downwardly into engagement with the usual plug (not shown) in the discharge opening of the head 8 of the container, the tap rod being of a length adapted to extend to a point in the container adjacent the bottom 9 thereof surrounded by the refrigerating medium 4. The lower end of the tap rod is preferably screened as at 10, Fig. 3, and a suitable draft fitting 11 is provided on the tap rod to facilitate application and retention of the tap rod in sealed discharge relation to the container. As a matter of practice the draft fitting is also preferably provided with a conventional collar 13 having a tube 14 connected therewith through which a suitable fluid pressure medium may be applied to the interior of the container to augment the contained effervescence of the beer in assuring discharge of the beer through the tap rod to the valved tap faucet 15 on the tap rod, the tap faucet being arranged exteriorly of the service unit in spaced relation to the bar for accommodating vessels into which the beer is to be dispensed.

Mounted on the tap rod 7 adjacent the faucet 15 is a cooling jacket 16, the upper closed end of which is sealed to the rod by welding or the like, as at 17, Fig. 4. The jacket 16 extends downwardly into one of the bar openings 6 and preferably has a loose fit therein so that the tap rod may be readily withdrawn from the bar for cleansing or replacement. Sleeved within the jacket 16 in inwardly spaced telescoping relation thereto and outwardly spaced covering relation to the tap rod 7 is a cooling jacket 18 which is cooperative with the jacket 16. The jacket 18 has an open upper end 19 and a constricted lower end 20 having a loose fit on the tap rod for allowing water or similar refrigerating medium to pass downwardly in heat exchange relation over the portion of the tap rod 7 between the cooling jackets 16 and 18 and head 8 of the beer container.

In order to maintain the cooling jackets in telescoping relation, the inner jacket 18 is preferably provided with a spider 21 fixed to the jacket adjacent its lower end and arranged to be fixed to the bottom face 22 of the bar as by fastening devices 23 extending through apertures in the bearing flange 24 of the spider. The spider is provided with openings 25 therethrough to allow discharge of a circulating refrigerating medium from the channel 26 between the cooling jackets which extend both interiorly and exteriorly of the service unit and in heat transfer relation to the portion of the tap rod normally exposed to room temperatures.

With the arrangement illustrated in Figs. 1 and 2, it is also apparent that any refrigerating medium circulated through the channel 26 drops upon the head 8 of the container and ultimately rises above the bead 27 on the head of the container to pass over onto the side walls of the container in a uniformly distributed film covering the entire surface of the container in conjunction with the refrigerating medium 4 to effect heat transfer between the medium and contents of the container to aid in quickly cooling the beer.

In order to carry out the circulation of refrigerating medium, the lower end of the cooling jacket 18 is preferably provided with an inlet connection 28 having a conduit 29 attached thereto. The conduit 29 passes to a pump 30 which is suitably energized by a prime mover 31 preferably mounted in and upon the side walls of the service unit. The conduit 29 is provided with an extension 32 extending further downwardly to a point adjacent the bottom of the service unit below the surface of the refrigerating medium 4, where its open lower end is screened as at 33, Fig. 2.

In using an apparatus constructed and arranged as described and assuming that a container of beer has been suitably placed in the service unit compartment, the tap rod 7 is applied to the container in the usual manner in discharge relation thereto and fluid pressure medium may be applied to the container through the conduit provided therefor.

Beer is then forced from the container through the tap rod where it is held in check by the valved tap faucet to be drawn as needed.

When containers of beer are first placed in the service unit compartments the beer therein is usually warmer than the temperature at which the beer is most palatable. The beer in the tap rod is also quickly warmed by room and like temperatures so that, if drawn, such beer is either not palatable to the drinker or must be wasted in order to get to more properly serviced beer in the container.

Refrigerating medium having been placed in the container compartment about the bottom of the container, the pump 30 is started to circulate the refrigerating medium through the conduit 29 into the inner cooling jacket 18. Part of the refrigerating medium drips down through the constricted lower end 20 of the jacket in heat transfer relation to the tap rod to cool the portion thereof between the jacket and the head of the container. The remainder of the refrigerating medium passes upwardly to and through the channel 26 to the outer cooling jacket 16 from whence it passes downwardly between the jackets through the openings in the jacket supporting spider onto the head of the container. The refrigerating medium quickly accumulates on the head of the container and soon passes over the bead thereof in a steady stream about the sides of the container in heat transfer relation thereto to quickly and efficiently aid in cooling the contents of the container.

The refrigerating medium is thus returned to its source and is available for recirculation through the system outlined to initially cool and maintain in cooled condition beer or the like contained in a keg or barrel and in the discharge tap conduits of such containers.

It is thus believed apparent that I have provided a cooling apparatus having the desirable characteristics and advantages outlined hereinabove.

While I have referred to my invention as a cooling apparatus for beverage dispensers and have described the apparatus as employed in cooling beer in containers and discharge conduits for the containers, it is apparent that beverages other than beer may be similarly cooled without departing from the spirit of the present invention.

What I claim and desire to secure by Letters Patent is:

1. In combination with a tap rod for a beverage container, a cooling jacket having a closed upper end sealingly engaged with the rod and an open lower end forming a channel, and a cooling jacket arranged within and in spaced relation to said first named jacket and in surrounding relation to the tap rod, said second named jacket having an open upper end and a constricted lower end, and means for applying refrigerant to the second named jacket.

2. In combination with a tap rod for a beverage container, a cooling jacket having a closed upper end sealingly engaged with the rod and an open lower end, a cooling jacket arranged within and in spaced relation to said first named jacket and in surrounding relation to the tap rod, said second named jacket having an open upper end and a constricted lower end, a pump, an inlet connection for said second named jacket connected with the pump, and a supply of refrigerating medium communicating with the pump.

3. In an apparatus of the character described, a beverage container, a conduit leading from the container to dispense beverage therefrom, a cooling jacket mounted on and about the conduit having a closed upper and an open lower end, a housing for the container, the conduit extending through a wall of said housing, a second jacket arranged within the first named jacket in surrounding relation to the conduit and opening into the first named jacket, and a supply of refrigerating medium communicating with said second named jacket.

4. In an apparatus of the character described, a beverage container, a conduit leading from the container to dispense beverage therefrom, a cooling jacket mounted on and about the conduit having a closed upper and an open lower end, a housing for the container, the conduit extending through a wall of said housing, a second jacket arranged within the first named jacket in surrounding relation to the conduit and opening into the first named jacket, and a supply of refrigerating medium communicating with said second named jacket, said second named jacket having a spider fixed to said wall and provided with openings to pass refrigerating medium from the first named jacket back to the housing.

GILBERT O. HALL.